United States Patent
Zhang et al.

(10) Patent No.: US 11,751,188 B2
(45) Date of Patent: Sep. 5, 2023

(54) BEAM SWEEP BOUNDARY ALIGNMENT HANDLING

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/477,677

(22) Filed: Sep. 17, 2021

(65) Prior Publication Data
US 2023/0091141 A1    Mar. 23, 2023

(51) Int. Cl.
*H04B 7/00* (2006.01)
*H04W 72/044* (2023.01)
*H04L 1/08* (2006.01)
*H04L 5/14* (2006.01)
*H04W 74/08* (2009.01)

(52) U.S. Cl.
CPC ............ *H04W 72/046* (2013.01); *H04L 1/08* (2013.01); *H04L 5/14* (2013.01); *H04W 74/08* (2013.01)

(58) Field of Classification Search
CPC ...... H04W 72/046; H04W 74/08; H04L 1/08; H04L 5/14; H04L 5/0062; H04L 5/0023; H04B 7/0695; H04B 7/088; H04B 7/0404
USPC ........................................................ 370/277
See application file for complete search history.

(56) References Cited

U.S. PATENT DOCUMENTS

2002/0094038 A1*  7/2002  Okamura .......... H03M 13/2957
                                                              375/340
2021/0152418 A1   5/2021  Abdelghaffar et al.

FOREIGN PATENT DOCUMENTS

WO    WO-2021108572 A1    6/2021

OTHER PUBLICATIONS

International Search Report and Written Opinion—PCT/US2022/074535—ISA/EPO—dated Nov. 3, 2022.

* cited by examiner

*Primary Examiner* — Chuong T Ho
(74) *Attorney, Agent, or Firm* — Norton Rose Fulbright LLP

(57) ABSTRACT

This disclosure provides systems, methods, and apparatuses, including computer programs encoded on computer storage media, for wireless communication. In one aspect of the disclosure, a method for wireless communication includes shifting, based on a partial overlap between a scheduled downlink transmission occasion and a scheduled uplink transmission occasion that each include a first and second repetition, a first repetition boundary of one transmission occasion of the downlink transmission occasion or the uplink transmission occasion, and performing full duplex communication with repetition based on the shifted first repetition boundary. In some implementations, shifting includes shifting an entirety of the one transmission occasion. In some implementations, shifting the first repetition boundary changes a number of consecutive symbols included in the first repetition of the one transmission occasion. In some implementation, the method includes adding a third repetition boundary to the one transmission occasion. Other aspects and features are also claimed and described.

24 Claims, 9 Drawing Sheets

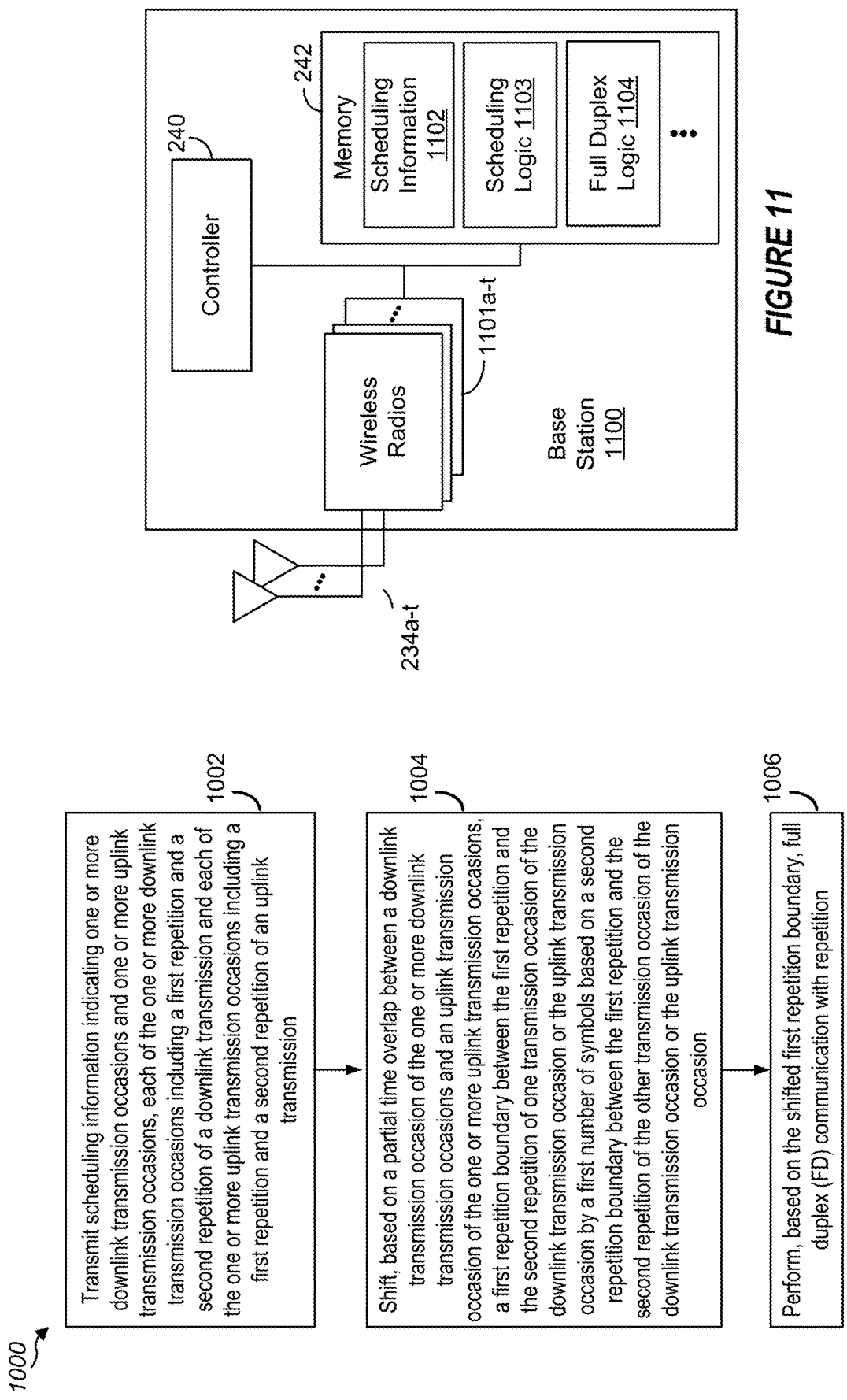

BEAM SWEEP BOUNDARY ALIGNMENT HANDLING

TECHNICAL FIELD

Aspects of the present disclosure relate generally to wireless communication systems, and more particularly, to beam sweep boundary alignment.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

Wireless communications systems may include one or more devices configured for full-duplex (FD) communication, such as sub-band full-duplex communication. In full-duplex communication, a first set of antennas of a device, such as a UE or a base station, are configured for downlink communication and a second set of the antennas are configured for uplink communication. However, a FD capability at a device may not be utilized if doing so would result in an uplink transmission beam of the device creating self-interference with respect to a downlink reception beam of the device, such as an amount of self-interference that is greater than or equal to a threshold. An amount of self-interference may also be impacted by a clutter associated with a reflection at or near a transmitting device, such that a reflection of a transmission is generated that is reflected back to the transmitting device.

A base station having FD capability schedules a downlink transmission occasion, such as a semi-persistent scheduling (SPS) transmission occasion, and an uplink transmission occasion, such as a configured grant (CG) transmission occasion, that each include a first and second repetition. To illustrate, the uplink transmission includes a first repetition associated with a first beam and a second repetition associated with a second beam, the scheduled downlink repetition includes a first repetition associated with a third beam and a second repetition associated with a fourth beam, the first beam and the third beam are a first matched beam pair, and the second beam and the fourth beam are a second matched beam pair. The scheduled downlink transmission occasion and the scheduled uplink transmission can be non-overlapping or at least partially overlapping in the time domain. A partial overlap of the scheduled downlink transmission occasion and the scheduled uplink transmission occasion may result in a mismatched beam pair being used for uplink transmission and downlink transmission during the scheduled downlink transmission occasion and the scheduled the uplink transmission occasion. For example, when the downlink and uplink transmission occasions partially overlap, the mismatched beam pair may be the first beam and the fourth beam, or the second beam and the third beam. Use of the mismatched beam pair may result in self-interference at the UE or base station, which may increase a latency associated with communicating downlink signals and uplink signals, reduce spectrum efficiencies, and reduce resource utilization.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for wireless communication performed by a user equipment (UE). The method includes receiving scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. The method further includes shifting, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. The method also includes performing, based on the shifted first repetition boundary, full duplex (FD) communication with repetition. Performing the FD communication with repetition includes receiving, during the downlink transmission occasion, the first repetition of the respective downlink transmission via a first beam and the second repetition of the respective downlink transmission via a second beam, and transmitting, during the uplink transmission occasion, the first repetition of the respective uplink transmission via a third beam and the second repetition of the respective uplink transmission via a fourth beam.

Another innovative aspect of the subject matter described in this disclosure can be implemented in a UE. The UE includes at least one processor and a memory coupled with the at least one processor and storing processor-readable instructions that, when executed by the at least one processor, is configured to receive scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. The processor-readable instructions, when executed by the at least one processor, is further configured to shift, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. The processor-readable instructions, when executed by the at least one processor, is also configured to perform, based on the shifted first repetition boundary, FD communication with repetition. To perform the FD communication with repetition, the processor-readable instructions, when executed by the at least one processor, is also configured to receive, during the downlink transmission occasion, the first repetition of the respective downlink transmission via a first beam and the second repetition of the respective downlink transmission via a second beam, and initiate transmission of, during the uplink transmission occasion, the first repetition of the respective uplink transmission via a third beam and the second repetition of the respective uplink transmission via a fourth beam.

Another innovative aspect of the subject matter described in this disclosure can be implemented in an apparatus configured for wireless communication. The apparatus includes means for receiving scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. The apparatus further includes means for shifting, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. The apparatus also includes means for performing, based on the shifted first repetition boundary, FD communication with repetition. The means for performing the FD communication with repetition includes means for receiving, during the downlink transmission occasion, the first repetition of the respective downlink transmission via a first beam and the second repetition of the respective downlink transmission via a second beam, and means for transmitting, during the uplink transmission occasion, the first repetition of the respective uplink transmission via a third beam and the second repetition of the respective uplink transmission via a fourth beam.

Another innovative aspect of the subject matter described in this disclosure can be implemented in a non-transitory computer-readable medium storing instructions that, when executed by a processor, cause the processor to perform operations including receiving scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. The operations further including shifting, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. The operations also include performing, based on the shifted first repetition boundary, FD communication with repetition. Performing the FD communication with repetition includes receiving, during the downlink transmission occasion, the first repetition of the respective downlink transmission via a first beam and the second repetition of the respective downlink transmission via a second beam, and initiating transmission of, during the uplink transmission occasion, the first repetition of the respective uplink transmission via a third beam and the second repetition of the respective uplink transmission via a fourth beam.

Another innovative aspect of the subject matter described in this disclosure can be implemented in a method for wireless communication performed by a base station. The method includes transmitting scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. The method further includes shifting, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. The method also includes performing, based on the shifted first repetition boundary, FD communication with repetition. Performing the FD communication with repetition includes transmitting, during the downlink transmission occasion, the first repetition of the respective downlink transmission via a first beam and the second repetition of the respective downlink transmission via a second beam, and receiving, during the uplink transmission occasion, the first repetition of the respective uplink transmission via a third beam and the second repetition of the respective uplink transmission via a fourth beam.

Another innovative aspect of the subject matter described in this disclosure can be implemented in a base station. The base station includes at least one processor and a memory coupled with the at least one processor and storing processor-readable code that, when executed by the at least one processor, is configured to initiate transmission of scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. The processor-readable instructions, when executed by the at least one processor, is further configured to shift, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. The processor-readable instructions, when executed by the at least one processor, is also configured to perform, based on the shifted first repetition boundary, FD communication with repetition. To perform the FD communication with repetition, the processor-readable instructions, when executed by the at least one processor, is also configured to initiate transmission of, during the downlink transmission occasion, the first repetition of the respective downlink transmission via a first beam and the second repetition of the respective downlink transmission via a second beam, and receive, during the uplink transmission occasion, the first repetition of the respective uplink transmission via a third beam and the second repetition of the respective uplink transmission via a fourth beam.

Another innovative aspect of the subject matter described in this disclosure can be implemented in an apparatus configured for wireless communication. The apparatus includes means for transmitting scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. The apparatus further includes means for shifting, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. The apparatus also includes means for performing, based on the shifted first repetition boundary, FD communication with repetition. The means for performing the FD communication with repetition includes means for transmitting, during the downlink transmission occasion, the first repetition of the respective downlink transmission via a first beam and the second repetition of the respective downlink transmission via a second beam, and means for receiving, during the uplink transmission occasion, the first repetition of the respective uplink transmission via a third beam and the second repetition of the respective uplink transmission via a fourth beam.

Another innovative aspect of the subject matter described in this disclosure can be implemented in a non-transitory computer-readable medium storing instructions that, when executed by a processor, cause the processor to perform operations including initiating transmission of scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. The operations further including shifting, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. The operations also include performing, based on the shifted first repetition boundary, FD communication with repetition. Performing the FD communication with repetition includes initiating transmission of, during the downlink transmission occasion, the first repetition of the respective downlink transmission via a first beam and the second repetition of the respective downlink transmission via a second beam, and receiving, during the uplink transmission occasion, the first repetition of the respective uplink transmission via a third beam and the second repetition of the respective uplink transmission via a fourth beam.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 10 is a flow diagram illustrating an example process that supports beam sweep boundary alignment according to one or more aspects.

FIG. 11 is a block diagram of an example base station that supports beam sweep boundary alignment according to one or more aspects.

Like reference numbers and designations in the various drawings indicate like elements.

DETAILED DESCRIPTION

Figure 1:
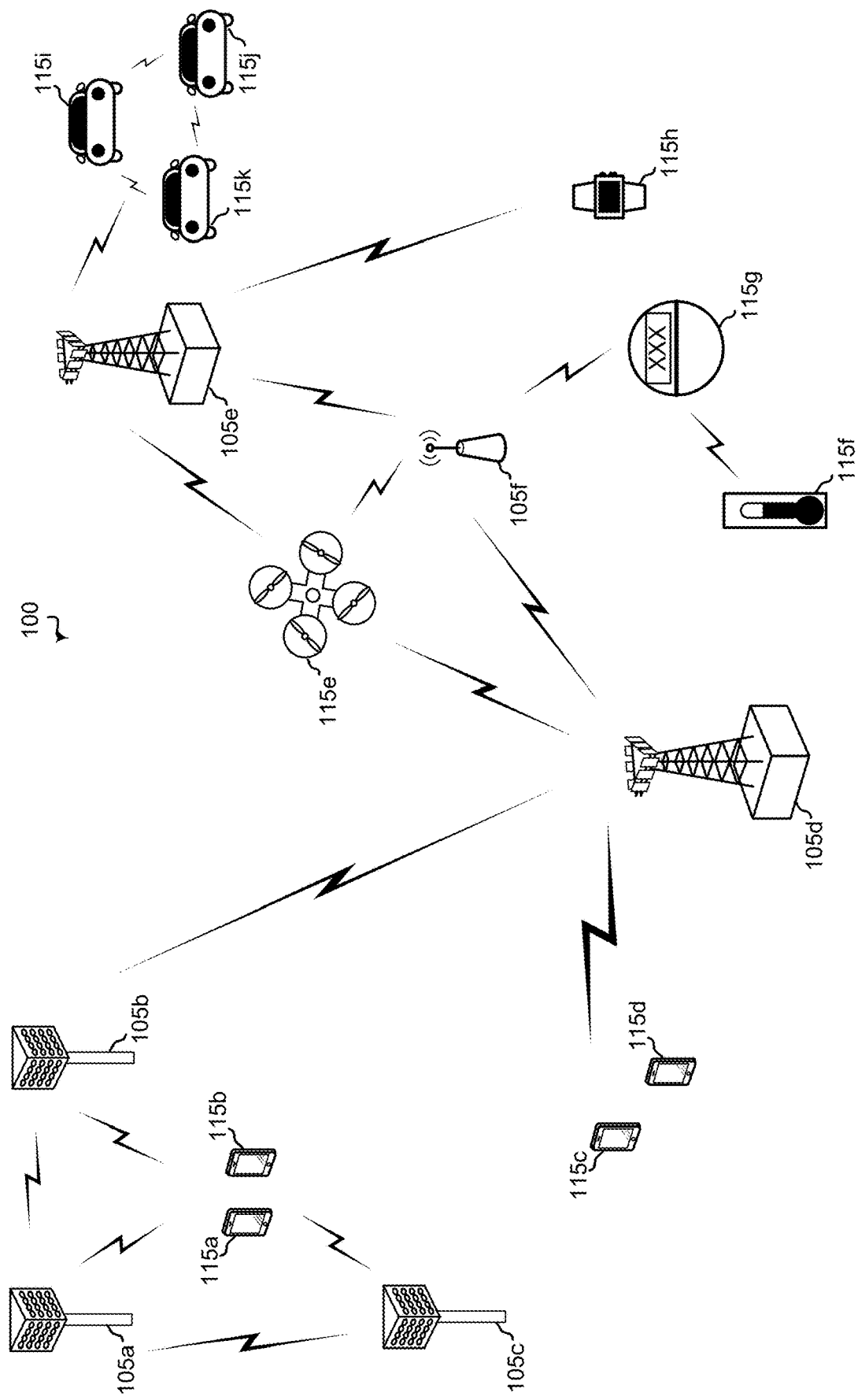
FIG. 1 is a block diagram illustrating details of an example wireless communication system according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The electromagnetic spectrum is often subdivided, based on frequency (or wavelength), into various classes, bands or channels. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band (or spectrum) in documents and articles, despite being different than the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The present disclosure provides systems, apparatus, methods, and computer-readable media that may be used for beam sweep boundary alignment. To illustrate, one or more devices, such as a user equipment (UE) or a base station, may identify a partial overlap between a scheduled downlink transmission occasion, such as a semi-persistent scheduling (SPS) occasion, and a scheduled uplink transmission occasion, such as a configured grant (CG) occasion, that each include a first and second repetition. In various aspects, the partial overlap of the scheduled downlink transmission occasion and the scheduled uplink transmission occasion results in a mismatched beam pair that would result in self-interference for the UE or the base station. To avoid or resolve the self-interference, a first repetition boundary (between a first repetition associated with use of a first beam and a second repetition associated with use of a second beam), also referred to as a beam-sweep boundary, of one transmission occasion of the downlink transmission occasion or the uplink transmission occasion is shifted a first number of symbols to eliminate use of the mismatched beam pair by aligning repetition boundaries between the uplink and downlink transmission occasions such that matched beam pairs are used during the first repetition and the second repetition of the uplink and downlink transmission occasions. The first repetition boundary may be shifted based on a second repetition boundary (between a first repetition associated with use of a third beam and a second repetition associated with use of a fourth beam) of the other transmission occasion of the downlink transmission occasion or the uplink transmission occasion such that the first repetition boundary and the second boundary are aligned in the time domain and such that the UL and DL beam pairs match for a duration of the uplink and downlink occasions. In some examples, in addition to shifting the first repetition boundary of the one transmission occasion, a start boundary, an end boundary, or both, of the one transmission occasion is also shifted. In some other examples, shifting the first repetition boundary of the one transmission occasion changes a number of consecutive symbols included in the first repetition of the one transmission occasion. Additionally, or alternatively, in some examples, an additional repetition boundary is added to the one transmission occasion such that a repetition of the one transmission occasion includes a first portion and a second portion. To illustrate, for a transmission occasion that includes a first repetition boundary between a first repetition of the transmission occasion and a second repetition of the transmission occasion, a second repetition boundary is added to the second repetition such that the second repetition is divided into a first portion that remains as the second repetition and a second portion that is becomes part of the first repetition. Accordingly, the addition of the second repetition boundary results in a duration of the second repetition being reduced and the first repetition having to separate portions of the transmission occasion.

Particular implementations of the subject matter described in this disclosure can be implemented to realize one or more of the following potential advantages. In some aspects, the present disclosure resolves a scheduled mismatched beam pair associated with an overlap between a scheduled downlink transmission occasion and a scheduled uplink transmission occasion by shifting a repetition boundary such that the mismatched beam pair is not used and repetition boundaries of the downlink and uplink transmission occasions are aligned so matched pairs are used. Shifting the repetition boundary to resolve the mismatch enables FD communication with reduced or no self-interference. Additionally, or alternatively, shifting the repetition boundary to resolve the mismatch avoids dropping a scheduled occasion to avoid the mismatch which would result in a failure to utilize FD communication, increased latency, reduced spectrum, or reduced resource utilization.

Two or more wireless communications systems, also referred to as wireless communications networks, may be configured to provide or participate in authorized shared access between the two or more wireless communications systems. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as 99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth.

For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

In some implementations, the wireless communications system 100 implements a 5G New Radio (NR) network. For example, the wireless communications system 100 may include multiple 5G-capable UEs 115 and multiple 5G-capable base stations 105, such as UEs and base stations configured to operate in accordance with a 5G NR network protocol such as that defined by the 3GPP.

Figure 2:
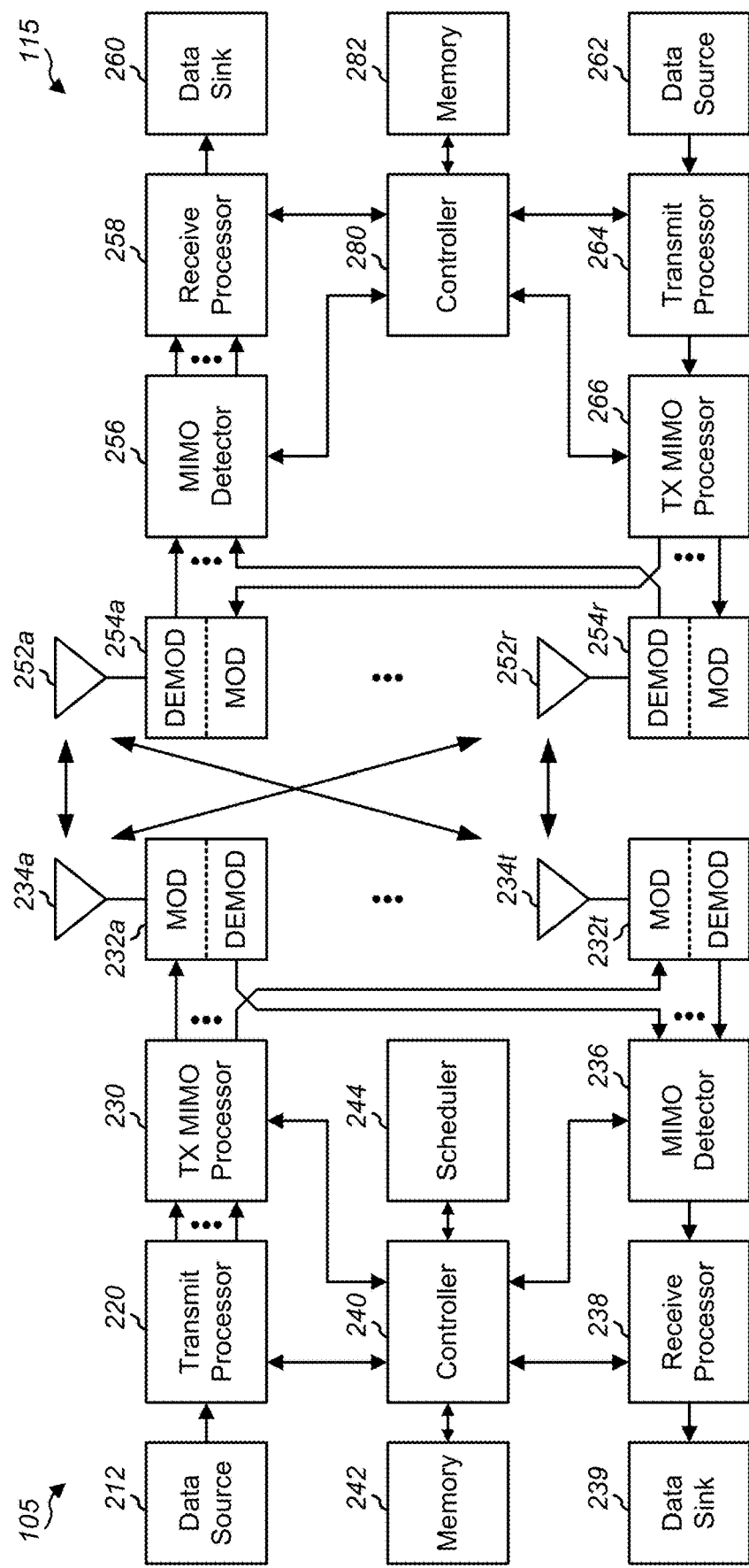
FIG. 2 is a block diagram illustrating examples of a base station and a user equipment (UE) according to one or more aspects.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

In some implementations, the antennas 234a-t may include multiple antenna elements configured to perform wireless communications with other devices, such as with the UE 115. In some implementations, the antennas 234a-t may be configured to perform wireless communications using different beams, also referred to as antenna beams. The beams may include TX beams and RX beams. To illustrate, the antennas 234a-t may include multiple independent sets (or subsets) of antenna elements (or multiple individual antenna arrays), and each set of antenna elements of the antennas 234a-t may be configured to communicate using a different respective beam that may have a different respective direction than the other beams. For example, a first set of antenna elements of the antennas 234a-t may be configured to communicate via a first beam having a first direction, and a second set of antenna elements of the antennas 234a-t may be configured to communicate via a second beam having a second direction. In other implementations, the antennas 234a-t may be configured to communicate via more than two beams. Alternatively, one or more sets of antenna elements of the antennas 234a-t may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antennas 234a-t may include or correspond to multiple antenna panels, and each antenna panel may be configured to communicate using a different respective beam.

In some implementations, the base station 105 may be configured for sub-band full-duplex communication. For example, the base station 105 may include hardware that is configurable for full-duplex operations. The hardware may include two panels, such as a first panel and a second panel for simultaneous transmit and receive operations. For example, the first panel may be configured for transmit operations and the second panel may be configured receive operations.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

In some implementations, the antennas 252a-r may include multiple antenna elements configured to perform wireless communications with other devices, such as with the base station 105. In some implementations, the antennas 252a-r may be configured to perform wireless communications using different beams, also referred to as antenna beams. The beams may include TX beams and RX beams.

To illustrate, the antennas 252a-r may include multiple independent sets (or subsets) of antenna elements (or multiple individual antenna arrays), and each set of antenna elements of the antennas 252a-r may be configured to communicate using a different respective beam that may have a different respective direction than the other beams. For example, a first set of antenna elements of the antennas 252a-r may be configured to communicate via a first beam having a first direction, and a second set of antenna elements of the antennas 252a-r may be configured to communicate via a second beam having a second direction. In other implementations, the antennas 252a-r may be configured to communicate via more than two beams. Alternatively, one or more sets of antenna elements of the antennas 252a-r may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antennas 252a-r may include or correspond to multiple antenna panels, and each antenna panel may be configured to communicate using a different respective beam.

In some implementations, the UE 115 may be configured for sub-band full-duplex communication. For example, the UE 115 may include hardware that is configurable for full-duplex operations. The hardware may include two panels, such as a first panel and a second panel for simultaneous transmit and receive operations. For example, the first panel may be configured for transmit operations and the second panel may be configured receive operations.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 4-7, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3A:
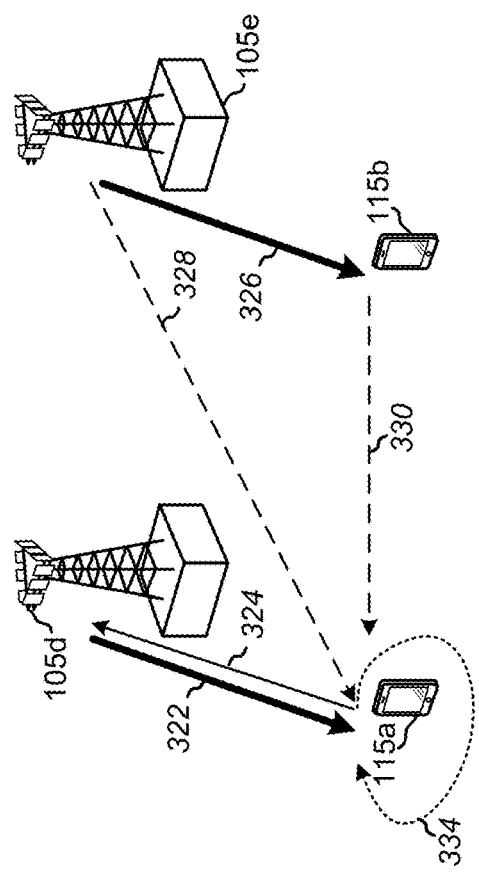
FIGS. 3A, 3B, and 3C are diagrams illustrating examples of wireless communication systems that support full-duplex communication modes according to some aspects.
Figure 3B:
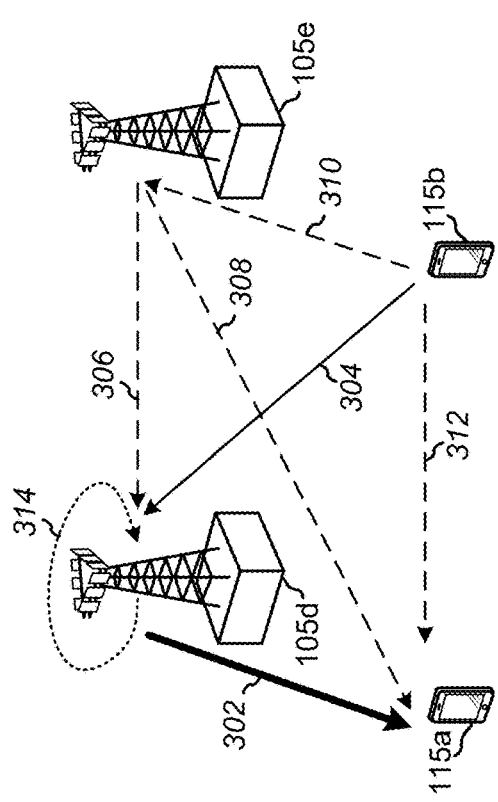
Figure 3C:
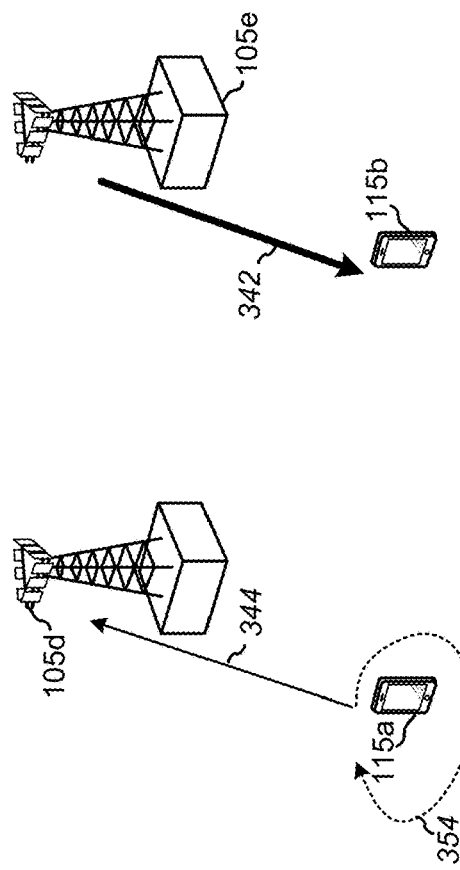

FIGS. 3A, 3B, and 3C are diagrams illustrating examples of wireless communication systems that support full-duplex communication modes according to some aspects. The wireless communication systems include the base stations 105d and 105e and the UEs 115a and 115b.

For full-duplex operation, a device typically divides resources, such as antennas of an antenna array, into uplink resources and downlink resources that may operate at the same time. For example, if the device is a base station, a first portion of the resources may be configured as downlink resources configured to transmit downlink signal and a second portion of the resources may be configured as uplink resources configured to receive uplink signals. In such a configuration, the transmission of the downlink signals may cause interference on the uplink signals that are received concurrently with transmission of the downlink signals. Other interference may be present with respect to downlink signals and uplink signals associated with the other base station or the UEs. Alternatively, if the device is a UE, a first portion of the resources may be configured as uplink resources and a second portion of the resources may be configured as downlink resources. In such a configuration, the transmission of the uplink signals may cause interference on the downlink signals that are received concurrently with transmission of the downlink signals.

In the example shown in FIG. 3A, the base station 115d is configured for full-duplex operation and the UE 115a is configured for half-duplex operation. The base station 115d transmits a downlink signal 302 to the UE 115a and receives an uplink signal 304 from the UE 115. The base station 314 generates self-interference from the downlink signal 302 to the uplink signal 304. Additionally, communications from the base station 105e cause interference 306 for the base station 105d and cause interference 308 for the UE 115a. Communications from the UE 115b cause interference 310 for the base station 105e and cause interference 312 for the UE 115a.

In the example shown in FIG. 3B, the base station 115d is configured for full-duplex operation and the UE 115a is configured for full-duplex operation. The UE 115 transmits an uplink signal 324 to the base station 105d and receives a downlink signal 322 from the base station 105d. Additionally, or alternatively, the UE 115 could transmit the uplink signal 314 to the base station 105e. The UE 115a generates self-interference 334 from the uplink signal 324 to the downlink signal 322. Additionally, the base station 105e transmits a downlink signal 326 to the UE 115b. Communications from the base station 105e may also cause interference 328 for the UE 115a. Communications from the UE 115b may also cause interference for the UE 115a.

In some implementation of FIG. 3B, the UE 115a may be configured for full-duplex operation and the base station 115d may be configured for half-duplex operation. The base station 105d may transmit the downlink signal 322 to the UE 115a, and the UE 115a may transmit an uplink signal 324 to the base station 105e.

In the example shown in FIG. 3C, the UE 115a is configured for full-duplex operation with multiple transmission/reception points (Multi-TRP). The UE 115a transmits an uplink signal 344 to the base station 105d the UE 115b receives a downlink 342 from the base station 105e. The UE 115a experiences self-interference 354 based on the uplink signal 344 interfering with one or more downlink signals for the UE 115a. For example, the uplink signal 344 may cause interference for a PDCCH from the base station 105d or the base station 105e to the UE 115a.

Figure 4:
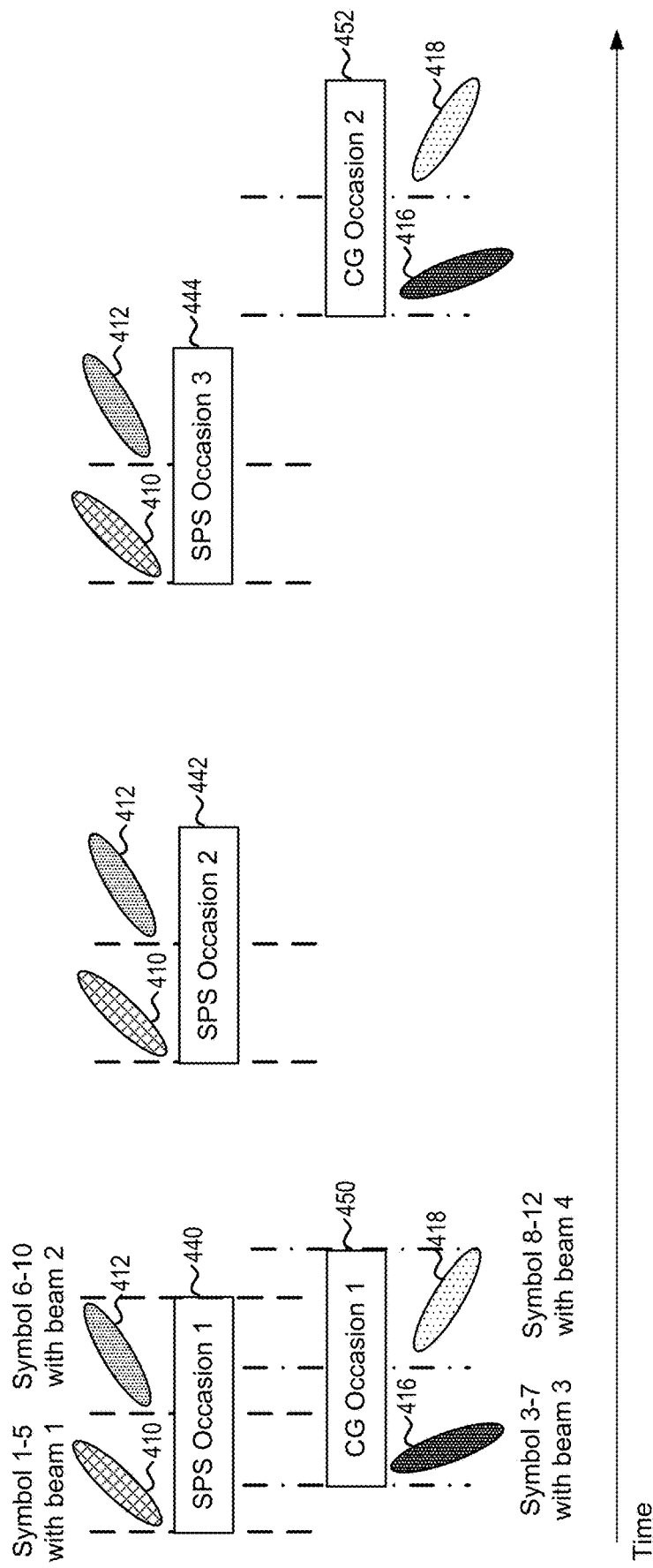
FIG. 4 is a diagram illustrating an example of scheduled full-duplex (FD) transmissions according to one or more aspects.

FIG. 4 is a diagram illustrating an example of scheduled FD transmissions according to one or more aspects. The FD transmissions are shown over a time period. The FD transmissions include downlink transmission occasions and uplink transmission occasions, each of which may be associated with multiple beams. The downlink transmission occasions may be transmitted by a base station 105 of FIG. 1 or 2 and the uplink transmission occasions may be transmitted by a UE 115 of FIG. 1 or 2.

In some implementations, the downlink transmission occasions include one or more SPS transmission occasions and the uplink transmission occasions includes one or more CG transmission occasions. The one or more SPS transmission occasions and the one or more CG transmission occasions can each be periodic scheduled transmission occasions, such as simultaneous and overlapping or partially downlink SPS transmission occasions and uplink CG transmission occasions. The one or more SPS transmission occasions and the one or more CG transmission occasions can be separately scheduled or can be scheduled via a scheduling message transmitted by the base station 105 and received by the UE 115. To illustrate, the one or more SPS transmission occasions and the one or more CG transmission occasions can be separately scheduled or can be scheduled via a single downlink control information (DCI) or a single radio resource control (RRC). For example, the one or more SPS transmission occasions may be scheduled via a first DCI or a first RRC, and the one or more CG transmission occasions may be scheduled via a second DCI or a second RRC. The first DCI and the second DCI may be the same DCI or different DCIs. Additionally, or alternatively, the first RRC and the second RRC may be the same RRC or different RRCs.

Each of the one or more SPS transmission occasions and the one or more CG transmission occasions may be scheduled with repetitions for beam sweeping. For example, each SPS transmission occasion may be scheduled with a first number of repetitions and each CG transmission occasion may be scheduled with a second number of repetitions. The first number of repetitions and the second number of repetitions may be the same or different.

As shown in FIG. 4, three SPS transmission occasions are scheduled and two CG transmission occasions are scheduled. The SPS transmission occasions includes a first SPS transmission occasion 440 (SPS Occasion 1), a second SPS transmission occasion 442 (SPS Occasion 2), and a third SPS transmission occasion 444 (SPS Occasion 3). The CG transmission occasions include a first CG transmission occasion 450 (OC Occasion 1) and a second CG transmission occasion 452 (OC Occasion 2). Each SPS transmission occasion and each CG transmission occasion is scheduled with repetitions for beam sweeping, which may enhance a reliability of the uplink transmission, the downlink transmission, or both. For example, each SPS transmission occasion 440, 442, and 444 is scheduled with a repetition equal to two to do a beam sweep on a first beam 410 (beam 1) and a second beam 412 (beam 2). A first beam sweep boundary, also referred to as a repetition boundary, occurs at a transition between the first beam 410 and the second beam 412. Each CG transmission occasion 450 and 452 is scheduled with a first repetition equal to two to do a beam sweep on a third beam 416 (beam 3) and a fourth beam 418 (beam 4). A second beam sweep boundary, also referred to as a second repetition boundary, occurs at a transition between the third beam 416 and the fourth beam 418. Although the repetition of each of the SPS transmission occasions and the CG transmission occasions is equal to two, in other implementations, a repetition of the SPS transmission occasions or the CG transmission occasions may be different, such as equal to four or eight, as illustrative, non-limiting examples.

A duration and a periodicity of the SPS transmission occasions and the CG transmission occasions can be the same or different. As shown in FIG. 4, each SPS transmission occasion 440, 442, and 444 and each CG transmission occasion 450 and 452 has the same duration, which is ten symbols. However, the SPS transmission occasions have a higher periodicity as compared to the CG transmission occasions.

Prior to the scheduled SPS transmission occasions and the CG transmission occasions, the UE 115 may perform beam management operations, such as FD beam management operations, in which the UE 115 measures a signal-to-noise ration of multiple beam pairs. Based on the measurements, the UE 115 may identify one or more beam pairs that may be used for FD operations. To illustrate, the UE 115 may compare a measurement to a threshold, and if the measurement satisfies the threshold, such as the measured SNR is less than or equal to the threshold, the UE determines the beam pair is acceptable for use. For example the UE 115 may have identified a first beam pair that includes the first beam 410 and the third beam 416, and second beam pair that includes the second beam 412 and the fourth beam 418, that are each acceptable. The UE 115 may also not that a third beam pair that includes the first beam 410 and the fourth beam 418, or a fourth beam pair that includes the second beam 412 and the third beam 416, do not satisfy the threshold. The UE 115 may send a report, such as a beam management report, that includes information indicating one or more acceptable beam pairs to the base station 105. In some implementations, the UE 115 may also measure signal-to-interference-noise ratio (SINR) and include an indication of the SINR in the report.

With reference to the second SPS transmission occasion 442, the third SPS transmission occasion 444, and the second CG transmission occasion 452, each of these transmission occasions do not overlap with another transmission occasion such that a half-duplex (HD) transmission may be performed. Stated differently, the second SPS transmission occasion 442 and the third SPS transmission occasion 44 do not overlap with a CG transmission occasion (or other uplink transmission scheduled to be transmitted to the base station 105), and the second CG transmission occasion 452 does not overlap with an SPS transmission occasion (or other downlink transmission scheduled to be received by the UE 115).

With reference to the first SPS transmission occasion 440 and the first CG transmission occasion 450, the first SPS transmission occasion 440 and the first CG transmission occasion 450 partially overlap. To illustrate, a start boundary of the first SPS transmission occasion 440 occurs at the beginning of the first symbol, the first beam sweep boundary occurs between the fifth symbol and the sixth symbol, and an end boundary of the first SPS transmission occasion 440 occurs at the end of the tenth symbol. A start boundary of the first CG transmission occasion 450 occurs at the beginning of the third symbol, the second beam sweep boundary occurs between the seventh symbol and the eighth symbol, and an end boundary of the first OC transmission occasion 450 occurs at the end of the twelfth symbol. Because the first and second beam sweep boundaries are not aligned, the first SPS transmission occasion 440 performs beam switching from the first beam 410 to the second beam 412 while the CG transmission occasion is performing an uplink transmission via the third beam 416. The concurrent uplink transmission via the third beam 416 and the downlink transmission via the second beam 412 during the sixth symbol and the seventh symbol may create self-interference with at the base station 105 with respect to the second beam 412 and may create self-interference at the UE 115 with respect to the third beam 416.

In some implementations, based on detecting a mismatch between the first SPS transmission occasion 440 and the first CG transmission occasion 450, the UE 115 may drop the first CG transmission occasion 450 or the base station 105 may drop the first SPS transmission occasion 440. Which of the first SPS transmission occasion 440 and the first CG transmission occasion 450 is dropped may be determined prior to detection of the mismatch based on a standard or signaling between the UE 115 and the base station 105, such as UE capability signaling, a DCI, or RRC signaling. By dropping one or both of the first SPS transmission occasion 440 and the first CG transmission occasion 450, self-interference at the UE 115 or the base station 105 may be reduced or eliminated.

In some implementations, a mismatch between the first SPS transmission occasion 440 and the first CG transmission occasion 450 may be determined even if the occasion boundaries of the first SPS transmission occasion 440 and the first CG transmission occasion 450 are aligned. To illustrate, if the occasion boundaries of the first SPS transmission occasion 440 and the first CG transmission occasion 450 are aligned, the first SPS transmission occasion 440 and the first CG transmission occasion 450 may have different repetition such that beam sweep boundaries of the first SPS transmission occasion 440 and the first CG transmission occasion 450 result in use of an unacceptable beam pair, such as an uplink beam and a downlink beam that produces an SNR that does not satisfy the threshold. In such situations, based on detecting a mismatch between the first SPS transmission occasion 440 and the first CG transmission occasion 450, the UE 115 may drop the first CG transmission occasion 450 or the base station 105 may drop the first SPS transmission occasion 440. By dropping one or both of the first SPS transmission occasion 440 and the first CG transmission occasion 450, self-interference at the UE 115 or the base station 105 may be reduced or eliminated.

Figure 5:
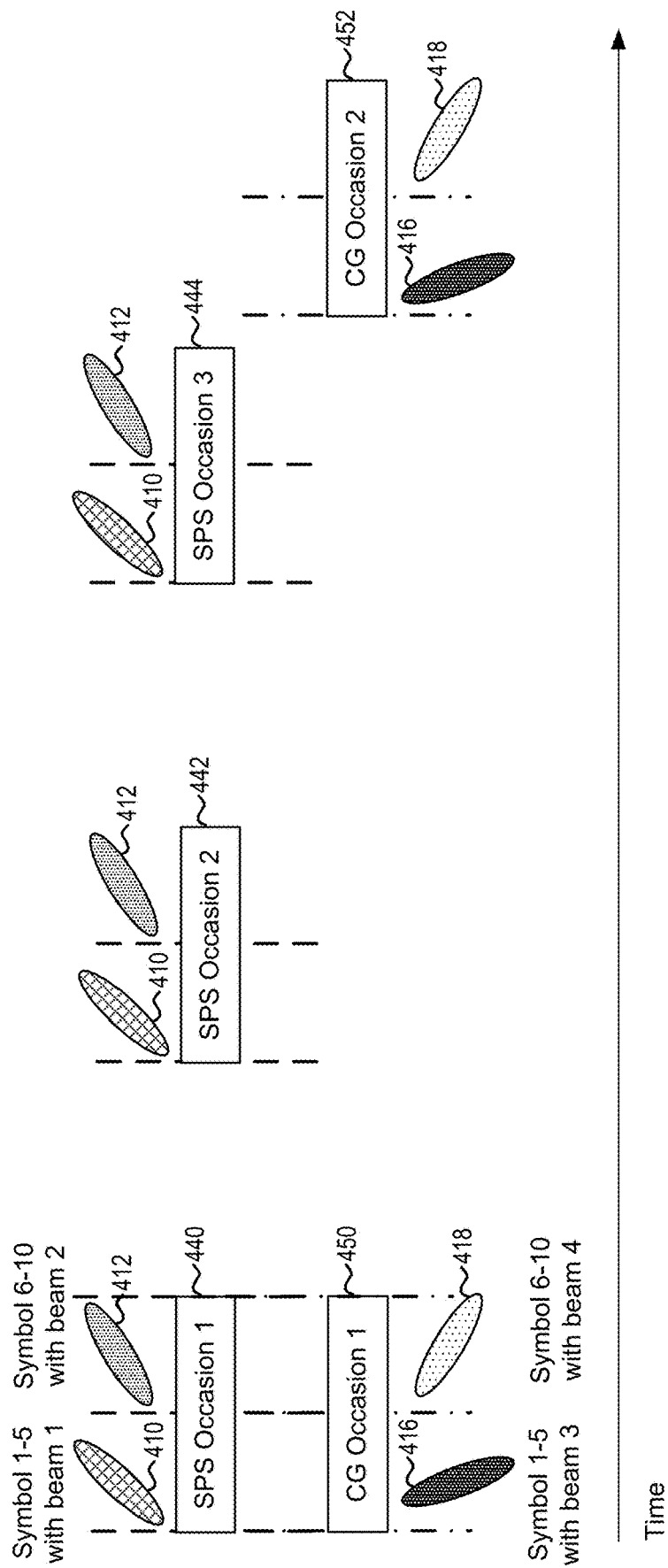
FIG. 5 is a diagram illustrating an example process that supports beam sweep boundary alignment according to one or more aspects.

FIG. 5 is a diagram illustrating an example process that supports beam sweep boundary alignment according to one or more aspects. As compared to FIG. 4, FIG. 5 illustrates shifting a repetition boundary of at least one of the first SPS transmission occasion 440 or the first CG transmission occasion 450 to avoid a beam mismatch. To illustrate, a mismatch condition may be identified, by the UE 115, the base station 105, or both, for the scheduled first SPS transmission occasion 440 and the scheduled first CG transmission occasion 450 as described with reference to FIG. 4. Based on the identified mismatch, a boundary of the first SPS transmission occasion 440 or a boundary of the first CG transmission occasion 450 is shifted to resolve the mismatch as described herein.

As shown in FIG. 5, the first CG transmission occasion 450 has been shifted to align the first CG transmission occasion 450 and the first SPS transmission occasion 440. Shifting the first CG transmission occasion 450 may include shifting the start boundary of the first CG transmission occasion 450 from the beginning of the third symbol to the beginning of the first symbol, shifting the second beam sweep boundary from occurring between the seventh symbol and the eighth symbol to occurring between the fifth symbol and the sixth symbol, shifting an end boundary of the first OC transmission occasion 450 from occurring at the end of the twelfth symbol to occurring at the end of the tenth symbol, or a combination thereof. Based on the shifted first CG transmission occasion 450, the beam sweep pattern of the first CG transmission occasion 450 is aligned with beam sweep pattern of the first SPS transmission occasion 440, so that a first repetition is on symbols 1-5 via the first beam pair including the first beam 410 and the third beam 416, and a second repetition is on symbols 6-10 via the second beam pair including the second beam 412 and the fourth beam 418.

The first CG transmission occasion 450 has been shifted two symbols based on the SPS scheduling resources and CG scheduling resources. In some implementations, the first CG transmission occasion 450 is implicitly shifted based on a standard. Stated in another manner, the first CG transmission occasion 450 is shifted without additional signaling other than the scheduling signaling. In other implementations, shifting the first CG transmission occasion 450 is based on signaling between the UE 115 and the base station 105, such as UE capability signaling, a DCI, or RRC signaling.

In some implementations, based on identifying the mismatch between the first SPS transmission occasion 440 and the first CG transmission occasion 450, the UE 115 (or the base station 105) determines whether the first CG transmission occasion 450 may be shifted. For example, a determination may be made as to whether or not the first CG transmission occasion 450 or the first SPS transmission occasion 440 may be shifted, such as shifting an entirety of an occasion, a start boundary or an end boundary, a repetition boundary, or a combination thereof, to avoid a beam mismatch. To illustrate, a determination is made as to whether or not an uplink transmission is scheduled on the first symbol or the second symbol. If an uplink transmission is scheduled, the first CG transmission occasion 450 may not be shifted and the first CG transmission occasion 450 or the first SPS transmission occasion 440 is dropped, i.e., no uplink transmission is performed, to avoid the mismatched. In some implementations, if an uplink transmission is scheduled in the direction of the shift, rather than drop the first CG transmission occasion 450 or the first SPS transmission occasion 440, a repetition boundary of the first CG transmission occasion 450 or the first SPS transmission occasion 440 may be altered as described with reference to FIG. 6 or 7, a repetition boundary may be added as described with reference to FIG. 7, or a combination thereof. Alternatively, if no uplink transmission is scheduled, the first CG transmission occasion 450 may be shifted.

Although FIG. 5 has been described as shifting the first CG transmission occasion 450, in other implementations, the first SPS transmission occasion 440 may be shifted, or both the first SPS transmission occasion 440 and the first CG transmission occasion 450 may be shifted. By shifting one or both of the first SPS transmission occasion 440 and the first CG transmission occasion 450 such that the first SPS transmission occasion 440 and the first CG transmission occasion 450 are aligned, self-interference at the UE 115 or the base station 105 may be reduced or eliminated.

Figure 6:
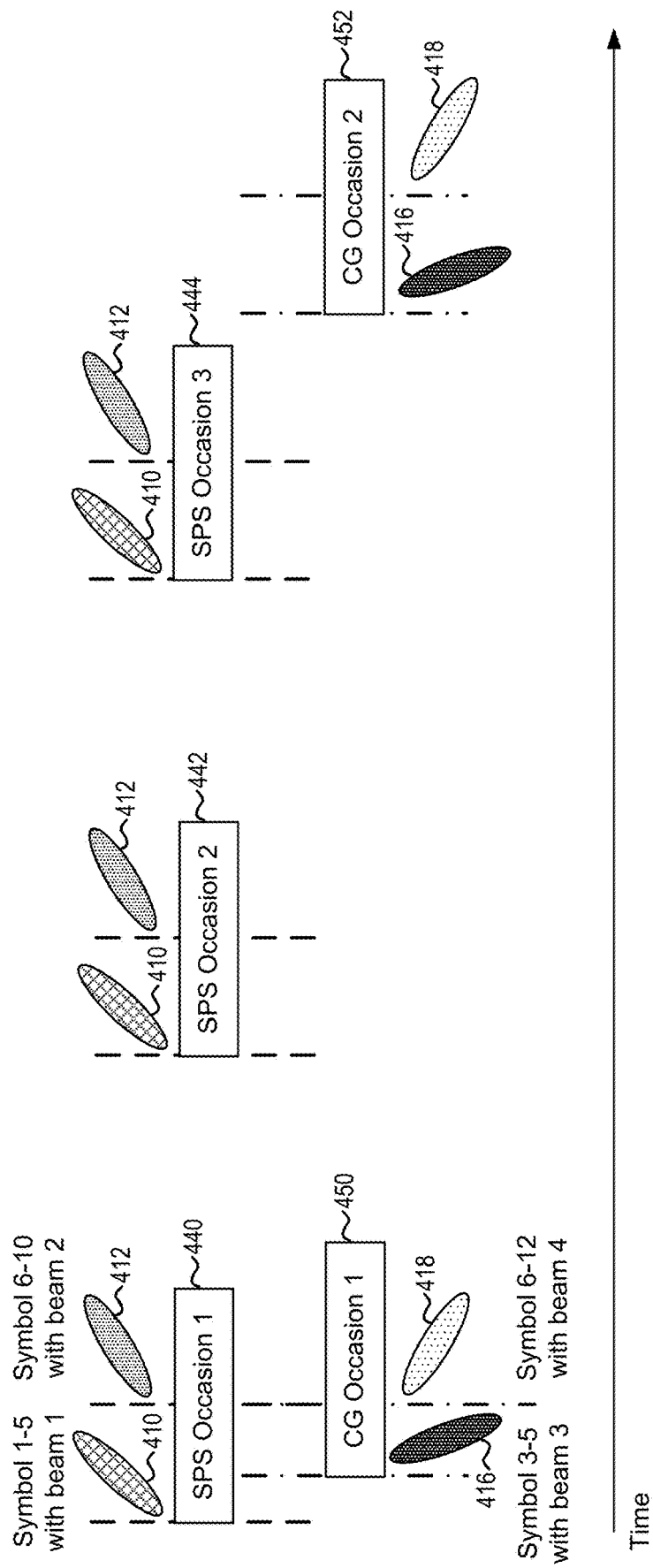
FIG. 6 is a diagram illustrating an example process that supports beam sweep boundary alignment according to one or more aspects.

FIG. 6 is a diagram illustrating an example process that supports beam sweep boundary alignment according to one or more aspects. As compared to FIG. 4, FIG. 6 illustrates shifting a boundary, such as a repetition boundary, of at least one of the first SPS transmission occasion 440 or the first CG transmission occasion 450 to avoid a beam mismatch. To illustrate, a mismatch condition may be identified, by the UE 115, the base station 105, or both, for the scheduled first SPS transmission occasion 440 and the scheduled first CG transmission occasion 450 as described with reference to FIG. 4. Based on the identified mismatch, a boundary of the first SPS transmission occasion 440 or a boundary of the first CG transmission occasion 450 is shifted to resolve the mismatch as described herein.

As shown in FIG. 6, a boundary of the first CG transmission occasion 450, has been shifted to align with a boundary of the first SPS transmission occasion 440. For example, a repetition boundary between associated with a transition from the third beam 416 to the fourth beam 428 has been shifted two symbols to align with a repetition boundary of the first SPS transmission occasion 400 associated with a transmission from the first beam 410 to the second beam 412. Although, FIG. 6 is shown as described as shifting the repetition boundary of the first CG transmission occasion 450 to align with the repetition boundary of the first SPS transmission occasion 440 to resolve the mismatch, in other implementations, the repetition boundary of the first SPS transmission occasion 440 or the repetition boundary of the first CG transmission occasion 450 and the repetition boundary of the first SPS transmission occasion 440, may be shifted to resolve the mismatch.

In some implementations, the repetition boundary of the first CG transmission occasion 450 is implicitly shifted based on a standard. Stated in another manner, the repetition boundary of the first CG transmission occasion 450 is shifted without additional signaling other than the scheduling signaling. In other implementations, shifting the repetition boundary of the first CG transmission occasion 450 is based on signaling between the UE 115 and the base station 105, such as UE capability signaling, a DCI, or RRC signaling.

Based on shifting the repetition boundary of the first CG transmission occasion 450, a first portion of the first CG transmission occasion 450 associated with the third beam 416 has three resources (symbols 3-5) and a second portion of the first CG transmission occasion 450 associate with the fourth beam 418 has seven resources (symbols 6-12). Data transmitted during the first portion via the third beam 416 may be transmitted at a first data transmission rate, may be compressed, or a combination thereof. Data transmitted during the second portion via the fourth beam 418 may be transmitted at a second data transmission rate. The first data transmission rate and the second data transmission rate may be the same or may be different. For example, the first data transmission rate may transmit data at a higher rate than the second data transmission rate, as an illustrative, non-limiting example.

In some implementations, the first repetition and the second repetition of the first SPS transmission occasion 440 or the first repetition and the second repetition of the first CG transmission occasion 450 may have the same layer (# layer), such as a layer associated with a time division multiplexed beam sweep), so that a demodulation reference signal (DMRS) pattern format the same channel estimation associated with one or more resources (one or more symbols) that have changed between the first repetition and the second repetition based on the shifted repetition boundary. Additionally, or alternatively, the first repetition and the second repetition of the first SPS transmission occasion 440 or the first repetition and the second repetition of the first CG transmission occasion 450 may be scheduled in the same band, or the same sub-band. Being scheduled in the same band (or sub-band) may enable a channel estimation to be more accurate. Additionally, or alternatively, if frequency hopping is configured for the first repetition and the second repetition, the symbols that change repetition, such as symbols 6 and 7, will stay on the same frequency, or will do frequency hopping together with the resources of the second repetition to improve channel estimation via DMRS of the second repetition.

In some implementations, if the number of repetitions is different between the first SPS transmission occasion 440 and the first CG transmission occasion 450, each potential switch of a repetition boundary needs to be checked to determine whether or not shifting the repetition boundary will result in a mismatch of a beam pair. If shifting the repetition boundary will result in a mismatch of a beam pair, the repetition boundary is not shifted or the occasion is dropped.

Although FIG. 6 has been described as shifting a boundary of the first CG transmission occasion 450, in other implementations, a boundary of the first SPS transmission occasion 440 may be shifted, or both a boundary of the first SPS transmission occasion 440 and a boundary of the first CG transmission occasion 450 may be shifted. By shifting one boundary or both boundary of the first SPS transmission occasion 440 and the first CG transmission occasion 450 such that the repetition boundaries of the first SPS transmission occasion 440 and the first CG transmission occasion 450 are aligned, self-interference at the UE 115 or the base station 105 may be reduced or eliminated.

Figure 7:
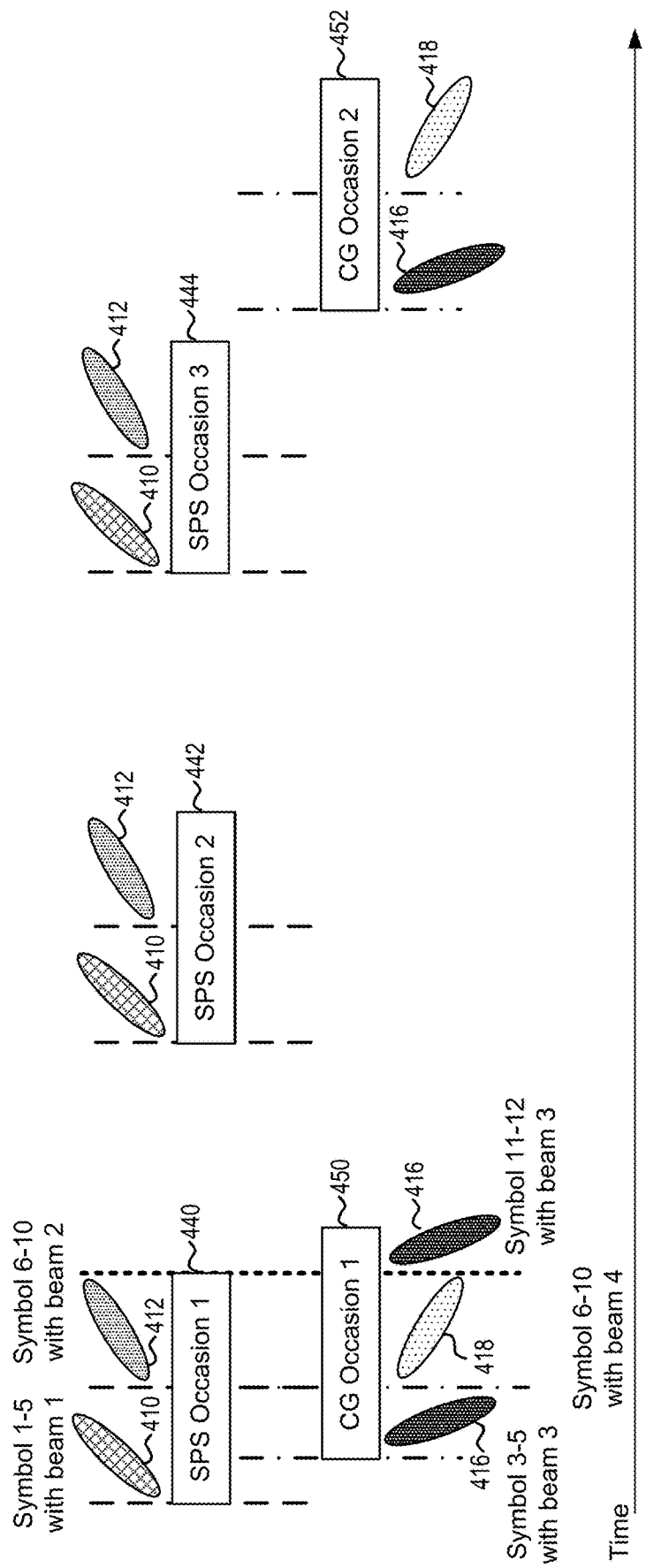
FIG. 7 is a diagram illustrating an example process that supports beam sweep boundary alignment according to one or more aspects.

FIG. 7 is a diagram illustrating an example process that supports beam sweep boundary alignment according to one or more aspects. As compared to FIG. 6, FIG. 7 illustrates adding a beam sweep boundary to at least one of the first SPS transmission occasion 440 or the first CG transmission occasion 450. To illustrate, a mismatch condition was identified, by the UE 115, the base station 105, or both, for the scheduled first SPS transmission occasion 440 and the scheduled first CG transmission occasion 450 as described with reference to FIG. 4. Based on the identified mismatch, a repetition boundary of the first SPS transmission occasion 440 or a repetition boundary of the first CG transmission occasion 450 is shifted to resolve the mismatch as described with reference to FIG. 6. As described herein, a repetition boundary is added, based on a start boundary or an end boundary of another transmission occasion, to the occasion having the shifted repetition boundary. Adding the repetition boundary may enable a number of resources for one or more repetitions to be maintained despite one or more repetition boundaries being shifted.

As shown in FIG. 7, a repetition boundary of the first CG transmission occasion 450, has been shifted to align with a repetition boundary of the first SPS transmission occasion 440. Additionally, another repetition boundary has been added and is associated with a beam switch from the fourth beam 418 (the second repetition) to the third beam 416 (the first repetition) which occurs between symbol 10 and symbol 11. Accordingly, the first repetition of the first CG transmission occasion 450 is associated with symbols 3-5 and 11-12, and the second repetition of the first CG transmission occasion 450 is associated with symbols 6-10. Stated in another manner, the first CG transmission occasion 450 includes a first portion associated with symbols 3-5 and the first repetition, a second portion associated with symbols 6-10 and the second repetition, and a third portion associated with symbols 11-12 and the first repetition.

In some implementations, the repetition boundary of the first CG transmission occasion 450 is implicitly added based on a standard. Stated in another manner, the repetition boundary of the first CG transmission occasion 450 is added without additional signaling other than the scheduling signaling. In other implementations, adding the repetition boundary of the first CG transmission occasion 450 is based on signaling between the UE 115 and the base station 105, such as UE capability signaling, a DCI, or RRC signaling.

In some implementations, data transmitted during the first portion via the third beam 416 may be transmitted at a first data transmission rate, may be compressed, or a combination thereof. Data transmitted during the second portion via the fourth beam 418 may be transmitted at a second data transmission rate. Additionally, or alternatively, data transmitted during the first portion via the third beam 416 may be transmitted at a third data transmission rate, may be compressed, or a combination thereof. One or more of the first data transmission rate, the second data transmission rate, or the third data transmission rate may be the same data rate or different data rates. To illustrate, the first data transmission rate or the third data transmission rate may transmit data at a higher rate than the second data transmission rate, as an illustrative, non-limiting example. Additionally, or alternatively, additional DMRS may be added to the third portion for channel estimation. In some implementations, the data to be transmitted during the third portion is compressed to make resources available for the additional DMRS.

Figure 8:
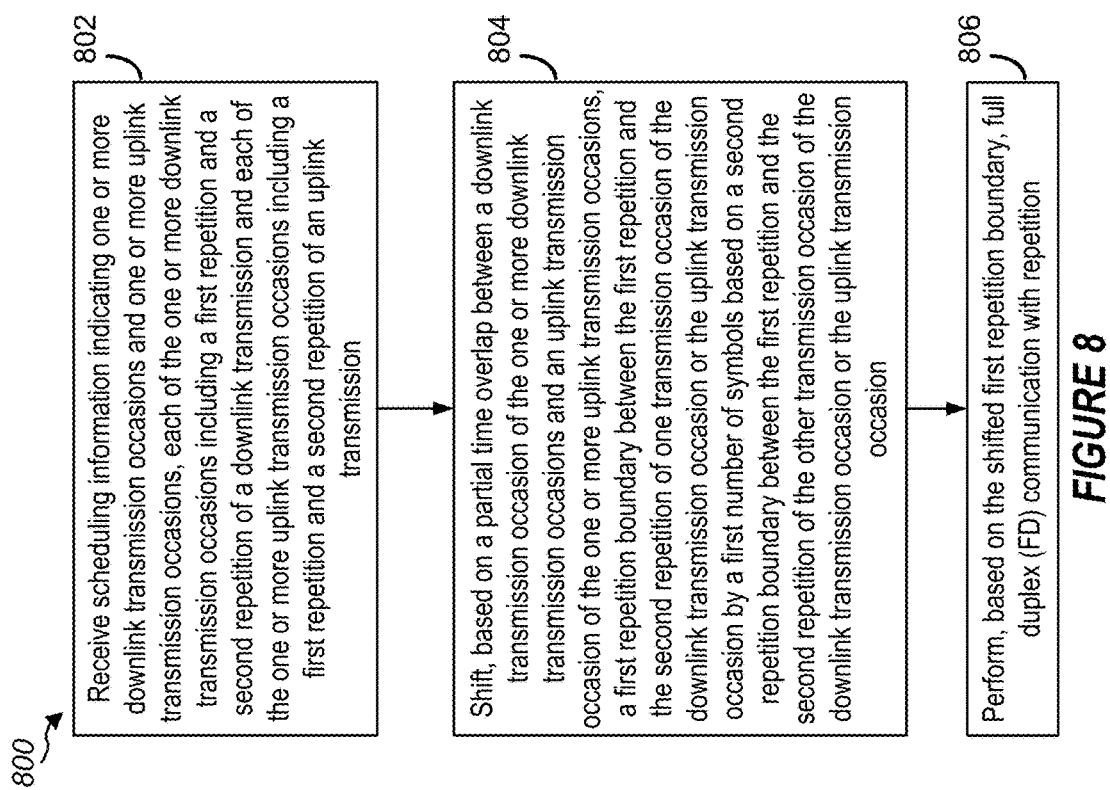
FIG. 8 is a flow diagram illustrating an example process that supports beam sweep boundary alignment according to one or more aspects.

FIG. 8 is a flow diagram illustrating an example process 800 that supports beam sweep boundary alignment according to one or more aspects. Operations of the process 800 may be performed by a UE, such as the UE 115 described above with reference to FIGS. 1 and 2 or a UE as described with reference to FIG. 9. For example, example operations (also referred to as "blocks") of the process 800 may enable the UE 115 to align a beam sweep boundary.

In block 802, the UE 115 receives scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. For example, the UE 115 may receive the scheduling information from the base station 105. To illustrate, the UE 115 may receive the scheduling information via one or more DCI, an RRC message, or a combination thereof. In some implementations, the one or more downlink transmission occasions include one or more SPS transmissions, and the one or more uplink transmission occasions include one or more CG transmissions. Additionally, or alternatively, a first matched beam pair includes the first beam and the third beam, a second matched beam pair include the second beam and the fourth beam, or a combination thereof.

In block 804, the UE 115 shifts, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. For example, the UE 115 may shift the first boundary as described with reference to FIGS. 5-7.

In block 806, the UE 115 performs, based on the shifted first repetition boundary, FD communication with repetition. Performing the FD communication with repetition may include receiving, during the downlink transmission occasion, the first repetition of the respective downlink transmission via a first beam and the second repetition of the respective downlink transmission via a second beam. Additionally, or alternatively, performing FD communication with repetition may include transmitting, during the uplink transmission occasion, the first repetition of the respective uplink transmission via a third beam and the second repetition of the respective uplink transmission via a fourth beam.

In some implementations, shifting the first repetition boundary of the one transmission occasion further includes shifting a start occasion boundary of the one transmission occasion or an end occasion boundary of the one transmission occasion. Additionally, or alternatively, the UE 115 may determine whether one or more symbols are available to shift a start occasion boundary or an end occasion boundary of the one transmission occasion of the downlink transmission occasion or the uplink transmission occasion by a first number of symbols. Based on a determination that the one or more symbols are unavailable, the UE 115 may determine whether or not to refrain from receiving the downlink transmission during the downlink transmission occasion or transmitting the uplink transmission during the uplink transmission occasion.

In some implementations, shifting the first repetition boundary may change a number of symbols of consecutive symbols included in the first repetition of the one transmission occasion. Additionally, or alternatively, the UE 115 may add a third repetition boundary to the one transmission occasion of the downlink transmission occasion or the uplink transmission occasion based on a start occasion boundary or an end occasion boundary of the other transmission occasion of the downlink transmission occasion or the uplink transmission occasion. The addition of the third repetition boundary may result in a first portion of a first repetition of the one transmission occasion of the downlink transmission occasion or the uplink transmission occasion that occurs prior to the first repetition boundary, a second repetition of the one transmission occasion of the downlink transmission occasion or the uplink transmission occasion that occurs between the first repetition boundary and the third repetition boundary, and a second portion of the first repetition of the one transmission occasion of the downlink transmission occasion or the uplink transmission occasion that occurs after the third repetition boundary. The one transmission occasion of the downlink transmission occasion or the uplink transmission occasion having the shifted first repetition boundary and the third repetition boundary includes a first number of resources associated with the first repetition of the one transmission occasion of the downlink transmission occasion or the uplink transmission occasion and a second number of resources associated with the second repetition of the one transmission occasion of the downlink transmission occasion or the uplink transmission occasion. In some implementations, the first number of resources and the second number of resources are the same number.

Figure 9:
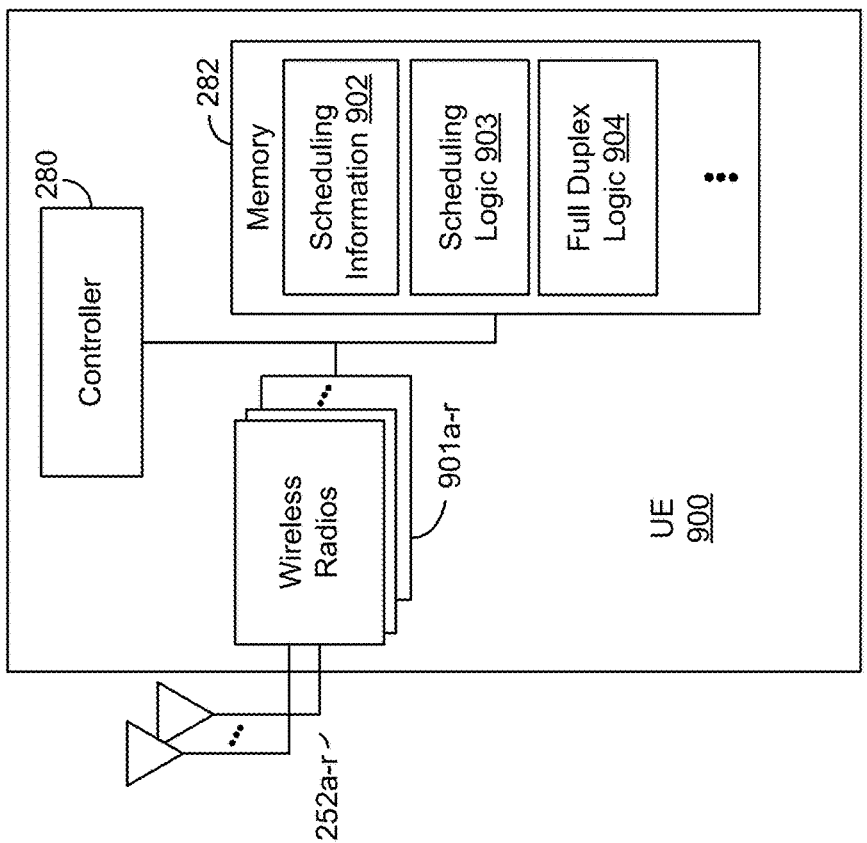
FIG. 9 is a block diagram of an example UE that supports beam sweep boundary alignment according to one or more aspects.

FIG. 9 is a block diagram of an example UE 900 that supports beam sweep boundary alignment according to one or more aspects. The UE 900 may be configured to perform operations, including the blocks of the process 800 described with reference to FIG. 8. In some implementations, the UE 900 includes the structure, hardware, and components shown and described with reference to the UE 115 of FIG. 2. For example, the UE 900 includes the controller 280, which operates to execute logic or computer instructions stored in the memory 282, as well as controlling the components of the UE 900 that provide the features and functionality of the UE 900. The UE 900, under control of the controller 280, transmits and receives signals via wireless radios 901*a-r* and the antennas 252*a-r*. The wireless radios 901*a-r* include various components and hardware, as illustrated in FIG. 2 for the UE 115, including the modulator and demodulators 254*a-r*, the MIMO detector 256, the receive processor 258, the transmit processor 264, and the TX MIMO processor 266.

As shown, the memory 282 may include scheduling information 902, scheduling logic 903, and full duplex logic 904. The scheduling information 902 may indicate a schedule of one or more uplink transmission occasions, one or more downlink transmission occasions, or a combination thereof. The scheduling logic 903 may be configured to adjust a schedule or a repetition boundary associated with a scheduled uplink transmission occasion, a scheduled downlink transmission occasion, or a combination thereof. The full duplex logic 904 may be configured to control full duplex operations, such as full duplex communication with repetition. The UE 900 may receive signals from or transmit signals to one or more network entities, such as the base station 105 of FIG. 1 or 2 or a base station as illustrated in FIG. 11.

In some implementations, the UE 900 may be configured to perform the process 800 of FIG. 8. To illustrate, the UE 900 may receive the scheduling information 902 from the base station 105, such as described with reference to block 802. The UE 900 may execute, under control of the controller 280, the scheduling logic 903 and the full duplex logic 904 stored in the memory 282. The execution environment of the scheduling logic 903 provides the functionality to perform at least the operations in block 804. The execution environment of the full duplex logic 904 provides the functionality to perform at least the operations in block 806.

FIG. 10 is a flow diagram illustrating an example process 1000 that supports beam sweep boundary alignment according to one or more aspects. Operations of the process 1000 may be performed by a base station, such as the base station 105 described above with reference to FIGS. 1-3 or a base station as described with reference to FIG. 11. For example, example operations of the process 1000 may enable the base station 105 to align a beam sweep boundary.

In block 1002, the base station 105 transmits scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. For example, the base station 105 may transmit the scheduling information to the UE 115. To illustrate, the base station 105 may transmit the scheduling information via one or more DCI, an RRC message, or a combination thereof. In some implementations, the one or more downlink transmission occasions include one or more SPS transmissions, and the one or more uplink transmission occasions include one or more CG transmissions. Additionally, or alternatively, a first matched beam pair includes the first beam and the third beam, a second matched beam pair include the second beam and the fourth beam, or a combination thereof.

In block 1004, the base station 105 shifts, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. For example, the UE 115 may shift the first boundary as described with reference to FIGS. 5-7.

In block 1006, the base station 105, based on the shifted first repetition boundary, full duplex (FD) communication with repetition. Performing the FD communication with repetition may include transmitting, during the downlink transmission occasion, the first repetition of the respective downlink transmission via a first beam and the second repetition of the respective downlink transmission via a second beam. Additionally, or alternatively, performing the FD communication with repetition may include receiving, during the uplink transmission occasion, the first repetition of the respective uplink transmission via a third beam and the second repetition of the respective uplink transmission via a fourth beam.

In some implementations, shifting the first repetition boundary of the one transmission occasion further includes shifting a start occasion boundary of the one transmission occasion or an end occasion boundary of the one transmission occasion. Additionally, or alternatively, the base station 105 may determine whether one or more symbols are available to shift a start occasion boundary or an end occasion boundary of the one transmission occasion of the downlink transmission occasion or the uplink transmission occasion by a first number of symbols. Based on a determination that the one or more symbols are unavailable, the base station 105 may determine whether or not to refrain from transmitting the downlink transmission during the downlink transmission occasion or receiving the uplink transmission during the uplink transmission occasion.

In some implementations, shifting the first repetition boundary may change a number of symbols of consecutive symbols included in the first repetition of the one transmission occasion. Additionally, or alternatively, the base station 105 may add a third repetition boundary to the one transmission occasion of the downlink transmission occasion or the uplink transmission occasion based on a start occasion boundary or an end occasion boundary of the other transmission occasion of the downlink transmission occasion or the uplink transmission occasion. The addition of the third repetition boundary may result in a first portion of a first repetition of the one transmission occasion of the downlink transmission occasion or the uplink transmission occasion that occurs prior to the first repetition boundary, a second repetition of the one transmission occasion of the downlink transmission occasion or the uplink transmission occasion that occurs between the first repetition boundary and the third repetition boundary, and a second portion of the first repetition of the one transmission occasion of the downlink transmission occasion or the uplink transmission occasion that occurs after the third repetition boundary. The one transmission occasion of the downlink transmission occasion or the uplink transmission occasion having the shifted first repetition boundary and the third repetition boundary includes a first number of resources associated with the first repetition of the one transmission occasion of the downlink transmission occasion or the uplink transmission occasion and a second number of resources associated with the second repetition of the one transmission occasion of the downlink transmission occasion or the uplink transmission occasion. In some implementations, the first number of resources and the second number of resources are the same number.

FIG. 11 is a block diagram of an example base station 1100 that supports beam sweep boundary alignment according to one or more aspects. The base station 1100 may be configured to perform operations, including the blocks of the process 1000 described with reference to FIG. 10. In some implementations, the base station 1100 includes the structure, hardware, and components shown and described with reference to the base station 105 of FIG. 1 or 2. For example, the base station 1100 may include the controller 240, which operates to execute logic or computer instructions stored in the memory 242, as well as controlling the components of the base station 1100 that provide the features and functionality of the base station 1100. The base station 1100, under control of the controller 240, transmits and receives signals via wireless radios 1101*a-t* and the antennas 234*a-t*. The wireless radios 1101*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

As shown, the memory 242 may include scheduling information 1102, scheduling logic 1103, and full duplex logic 1104. The scheduling information 1102 may indicate a schedule of one or more uplink transmission occasions, one or more downlink transmission occasions, or a combination thereof. The scheduling logic 1103 may be configured to adjust a schedule or a repetition boundary associated with a scheduled uplink transmission occasion, a scheduled downlink transmission occasion, or a combination thereof. The full duplex logic 1104 may be configured to control full duplex operations, such as full duplex communication with repetition. The base station 1100 may receive signals from or transmit signals to one or more UEs, such as the UE 115 of FIG. 1 or 2 or the UE 900 as illustrated in FIG. 9.

In some implementations, the base station 1100 may be configured to perform the process 1000 of FIG. 10. To illustrate, the base station 1100 may transmit the scheduling information 902 to the UE 115, such as described with reference to block 1002. To illustrate, the base station 1100 may execute, under control of the controller 240, the scheduling logic 1103 and the full duplex logic 1104 stored in the memory 242. The execution environment of the scheduling logic 1103 provides the functionality to perform at least the operations in block 1004. The execution environment of the full duplex logic 1104 provides the functionality to perform at least the operations in block 1006.

It is noted that one or more blocks (or operations) described with reference to FIG. 8 or 10 may be combined with one or more blocks (or operations) described with reference to another of the figures. For example, one or more blocks (or operations) of FIG. 8 may be combined with one or more blocks (or operations) of FIG. 4-7 or 9. As another example, one or more blocks associated with FIG. 10 may be combined with one or more blocks (or operations) associated with FIG. 4-7 or 11. Additionally, or alternatively, one or more operations described above with reference to FIG. 1 or 2 may be combined with one or more operations described with reference to FIG. 9 or 11.

In some aspects, techniques for supporting beam sweep boundary alignment may include additional aspects, such as any single aspect or any combination of aspects described below or in connection with one or more other processes or devices described elsewhere herein. In a first aspect, techniques for supporting beam sweep boundary alignment may include receiving scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. The techniques further include shifting, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. The techniques also include performing, based on the shifted first repetition boundary, FD communication with repetition including receiving, during the downlink transmission occasion, the first repetition of the respective downlink transmission via a first beam and the second repetition of the respective downlink transmission via a second beam, and transmitting, during the uplink transmission occasion, the first repetition of the respective uplink transmission via a third beam and the second repetition of the respective uplink transmission via a fourth beam. In some examples, the techniques in the first aspect may be implemented in a method or process. In some other examples, the techniques of the first aspect may be implemented in a wireless communication device such as a receive device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In some aspects, techniques for supporting beam sweep boundary alignment may include additional aspects, such as any single aspect or any combination of aspects described below or in connection with one or more other processes or devices described elsewhere herein. In a second aspect, techniques for supporting beam sweep boundary alignment may include transmitting scheduling information indicating one or more downlink transmission occasions and one or more uplink transmission occasions. Each of the one or more downlink transmission occasions includes a first repetition and a second repetition of a downlink transmission and each of the one or more uplink transmission occasions includes a first repetition and a second repetition of an uplink transmission. The techniques further include shifting, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion. The techniques also include performing, based on the shifted first repetition boundary, FD communication with repetition including transmitting, during the downlink transmission occasion, the first repetition of the respective downlink transmission via a first beam and the second repetition of the respective downlink transmission via a second beam, and receiving, during the uplink transmission the first repetition of the respective uplink transmission via a third beam and the second repetition of the respective uplink transmission via a fourth beam. In some examples, the techniques in the first aspect may be implemented in a method or process. In some other examples, the techniques of the second aspect may be implemented in a wireless communication device such as a receive device, which may include a base station or a component of a base station. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include one or more means configured to perform operations described herein.

In a third aspect, in combination with the first aspect, the scheduling information is received via one or more DCI, an RRC message, or a combination thereof.

In a fourth aspect, in combination with the second aspect, the scheduling information is transmitted via one or more DCI, an RRC message, or a combination thereof.

In a fifth aspect, in combination with one or more of the first aspect through the fourth aspect, the first number of symbols is one symbol.

In a sixth aspect, in combination with one or more of the first aspect through the fourth aspect, the first number of symbols is greater than one symbol.

In a seventh aspect, in combination with one or more of the first aspect through the sixth aspect, the one transmission occasion of the downlink transmission occasion or the uplink transmission occasion is the downlink transmission occasion, and the other transmission occasion of the downlink transmission occasion or the uplink transmission occasion is the uplink transmission occasion.

In an eighth aspect, in combination with one or more of the first aspect through the sixth aspect, the one transmission occasion of the downlink transmission occasion or the uplink transmission occasion is the uplink transmission occasion, and the other transmission occasion of the downlink transmission occasion or the uplink transmission occasion is the downlink transmission occasion.

In a ninth aspect, in combination with one or more of the first aspect through the eighth aspect, the first boundary is associated with a change from the first beam associated with the first repetition of the downlink transmission occasion to the second beam associated with the second repetition of the downlink transmission occasion.

In a tenth aspect, in combination with the ninth aspect, the second boundary is associated with a change from the third beam associated with the first repetition of the uplink transmission occasion to the fourth beam associated with the second repetition of the uplink transmission occasion.

In an eleventh aspect, in combination with one or more of the first aspect through the eighth aspect, the first boundary is associated with a change from the third beam associated with the first repetition of the uplink transmission occasion to the fourth beam associated with the second repetition of the uplink transmission occasion.

In a twelfth aspect, in combination with the eleventh aspect, the second boundary is associated with a change from the first beam associated with the first repetition of the downlink transmission occasion to the second beam associated with the second repetition of the downlink transmission occasion.

In a thirteenth aspect, in combination with one or more of the first aspect through the twelfth aspect, the techniques further include shifting, based on the partial overlap, the second repetition boundary of the other transmission occasion of the downlink transmission occasion or the uplink transmission occasion a second number of symbols based on the first repetition boundary.

In a fourteenth aspect, in combination the thirteenth aspect, performing the full duplex communication with repetition is further based on the shifted second repetition boundary.

In a fifteenth aspect, in combination with one or more of the first aspect through the fourteenth aspect, the one or more downlink transmission occasions include one or more SPS transmissions, the one or more uplink transmission occasions include one or more CG transmissions, a first matched beam pair includes the first beam and the third beam, a second matched beam pair include the second beam and the fourth beam, or a combination thereof.

In a sixteenth aspect, in combination with one or more of the first aspect through the fifteenth aspect, the scheduling information is transmitted by the base station or received by the UE via at least one of DCI or RRC signaling.

In a seventeenth aspect, in combination with one or more of the first aspect through the sixteenth aspect, each of the one or more downlink transmission occasions includes a first number of repetitions, each of the one or more uplink transmission occasions includes a second number of repetitions, and the first number of repetitions is the same as the second number of repetitions.

In an eighteenth aspect, in combination with one or more of the first aspect through the sixteenth aspect, each of the one or more downlink transmission occasions includes a first number of repetitions, each of the one or more uplink transmission occasions includes a second number of repetitions, and the first number of repetitions is different than the second number of repetitions.

In a nineteenth aspect, in combination with one or more of the first aspect through the eighteenth aspect, the first repetition of each of the of the one or more downlink transmission occasions is associated with the same first beam, and the second repetition of each of the one or more downlink transmission occasions is associated with the same second beam.

In a twentieth aspect, in combination with one or more of the first aspect through the nineteenth aspect, the first repetition of each of the one or more uplink transmission occasions is associated with the same third beam, and the second repetition of each of the one or more uplink transmission occasions is associated with a same fourth beam.

In a twenty-first aspect, in combination with one or more of the first aspect through the twentieth aspect, a first uplink-downlink transmission beam pair for FD communication includes the first beam and the third beam, a second uplink-downlink transmission beam pair for FD communication includes the second beam and the fourth beam.

In a twenty-second aspect, in combination with one or more of the first aspect through the twenty-first aspect, each of the one or more downlink transmission occasions has a same first duration, each of the one or more uplink transmission occasions includes a same second duration, and the first duration is the same as the second duration.

In a twenty-third aspect, in combination with one or more of the first aspect through the twenty-first aspect, each of the one or more downlink transmission occasions has a same first duration, each of the one or more uplink transmission occasions includes a same second duration, and the first duration is different than the second duration.

In a twenty-fourth aspect, in combination with one or more of the first aspect through the twenty-third aspect, the one or more downlink transmission occasions include multiple downlink transmission occasions that have a first periodicity, the one or more uplink transmission occasions include multiple uplink transmission occasions that have a second periodicity, and the first periodicity is the same as the second periodicity.

In a twenty-fifth aspect, in combination with one or more of the first aspect through the twenty-third aspect, the one or more downlink transmission occasions include multiple downlink transmission occasions that have a first periodicity, the one or more uplink transmission occasions include multiple uplink transmission occasions that have a second periodicity, and the first periodicity is different than the second periodicity.

In a twenty-sixth aspect, in combination with one or more of the first aspect through the twenty-fifth aspect, shifting the first repetition boundary of the one transmission occasion further includes shifting a start occasion boundary of the one transmission occasion or an end occasion boundary of the one transmission occasion.

In a twenty-seventh aspect, in combination with one or more of the first aspect through the twenty-sixth aspect, the techniques further include determining whether one or more symbols are available to shift a start occasion boundary or an end occasion boundary of the one transmission occasion of the downlink transmission occasion or the uplink transmission occasion by a first number of symbols.

In a twenty-eighth aspect, in combination with the twenty-seventh aspect, shifting the first repetition boundary aligns the first repetition boundary and the second repetition boundary in the time domain.

In a twenty-ninth aspect, in combination with the twenty-seventh aspect, the techniques further include, based on a determination that the one or more symbols are unavailable, determining whether or not to refrain from transmitting or receiving the downlink transmission during the downlink transmission occasion.

In a thirtieth aspect, in combination with the twenty-seventh aspect, the techniques further include, based on a determination that the one or more symbols are unavailable, determining whether or not to refrain from transmitting or receiving the uplink transmission during the uplink transmission occasion.

In a thirty-first aspect, in combination one or more of the first aspect through the thirtieth aspect, shifting the first repetition boundary changes a number of symbols of consecutive symbols included in the first repetition of the one transmission occasion.

In a thirty-second aspect, in combination with the thirty-first aspect, the first repetition of the downlink transmission occasion and the second repetition of the downlink transmission occasion include a same number of layers associated with a DMRS pattern format.

In a thirty-third aspect, in combination with the thirty-first aspect, first repetition of the downlink transmission occasion and the second repetition of the downlink transmission occasion are received on a same sub-band.

In a thirty-fourth aspect, in combination with the thirty-first aspect, before and after the first repetition boundary is shifted, the first repetition of the one transmission occasion of the downlink transmission occasion or the uplink transmission occasion is associated with a first frequency bandwidth and not a second frequency bandwidth, and the second repetition of the one transmission occasion of the downlink transmission occasion or the uplink transmission occasion is associated with the second frequency bandwidth and not the first frequency bandwidth.

In a thirty-fifth aspect, in combination with the thirty-first aspect, before the first repetition boundary is shifted, the first repetition of the one transmission occasion of the downlink transmission occasion or the uplink transmission occasion is associated with a first frequency bandwidth and not a second frequency bandwidth, and the second repetition of the one transmission occasion of the downlink transmission occasion or the uplink transmission occasion is associated with the second frequency bandwidth and not the first frequency bandwidth.

In a thirty-sixth aspect, in combination with the thirty-fifth aspect, before the first repetition boundary is shifted, a first portion of the second repetition of the one transmission occasion of the downlink transmission occasion or the uplink transmission occasion is associated with the first frequency bandwidth and a second portion of the second repetition of the one transmission occasion of the downlink transmission occasion or the uplink transmission occasion is associated with the second frequency bandwidth.

In a thirty-seventh aspect, in combination with the thirty-first aspect, the techniques further include adding a third repetition boundary to the one transmission occasion of the downlink transmission occasion or the uplink transmission occasion based on a start occasion boundary or an end occasion boundary of the other transmission occasion of the downlink transmission occasion or the uplink transmission occasion.

In a thirty-eighth aspect, in combination with the thirty-seventh aspect, the third repetition boundary is added such that a first portion of the first repetition of the one transmission occasion of the downlink transmission occasion or the uplink transmission occasion occurs prior to the first repetition boundary, the second repetition of the one transmission occasion of the downlink transmission occasion or the uplink transmission occasion occurs between the first repetition boundary and the third repetition boundary, and a second portion of the first repetition of the one transmission occasion of the downlink transmission occasion or the uplink transmission occasion occurs after the third repetition boundary.

In a thirty-ninth aspect, in combination with one or more of the third-seventh aspect or the thirty-eighth aspect, the one transmission occasion of the downlink transmission occasion or the uplink transmission occasion having the shifted first repetition boundary and the third repetition boundary includes a first number of resources associated with the first repetition of the one transmission occasion of the downlink transmission occasion or the uplink transmission occasion and a second number of resources associated with the second repetition of the one transmission occasion of the downlink transmission occasion or the uplink transmission occasion.

In a fortieth aspect, in combination with the third-ninth aspect, the first number of resources and the second number of resources are the same number.

In a forty-first aspect, in combination with the fortieth aspect, the third portion includes a DMRS portion and a data portion, the data portion including compressed data.

In a forty-second aspect, in combination with one or more of the first aspect through the forty-first aspect, each of the one or more downlink transmission occasions and each of the one or more uplink transmission occasions including a first repetition and a second repetition.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE), the method comprising:
receiving scheduling information indicating one or more downlink transmission occasions and one or more uplink transmission occasions, each of the one or more downlink transmission occasions including a first repetition and a second repetition of a downlink transmission and each of the one or more uplink transmission occasions including a first repetition and a second repetition of an uplink transmission;
shifting, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion; and
performing, based on the shifted first repetition boundary, full duplex (FD) communication with repetition including:
receiving, during the downlink transmission occasion, the first repetition of the respective downlink transmission via a first beam and the second repetition of the respective downlink transmission via a second beam; and
transmitting, during the uplink transmission occasion, the first repetition of the respective uplink transmission via a third beam and the second repetition of the respective uplink transmission via a fourth beam.

2. The method of claim 1, wherein:
the one or more downlink transmission occasions include one or more semi-persistent scheduling (SPS) transmissions,
the one or more uplink transmission occasions include one or more configured grant (CG) transmissions,
a first matched beam pair includes the first beam and the third beam, and
a second matched beam pair include the second beam and the fourth beam.

3. The method of claim 1, wherein shifting the first repetition boundary of the one transmission occasion further includes shifting a start occasion boundary of the one transmission occasion or an end occasion boundary of the one transmission occasion.

4. The method of claim 1, further comprising determining whether one or more symbols are available to shift a start occasion boundary or an end occasion boundary of the one transmission occasion of the downlink transmission occasion or the uplink transmission occasion by a first number of symbols.

5. The method of claim 4, further comprising, based on a determination that the one or more symbols are unavailable, determining whether or not to refrain from receiving the downlink transmission during the downlink transmission occasion or transmitting the uplink transmission during the uplink transmission occasion.

6. The method of claim 1, wherein shifting the first repetition boundary changes a number of symbols of consecutive symbols included in the first repetition of the one transmission occasion.

7. The method of claim 6, further comprising adding a third repetition boundary to the one transmission occasion of the downlink transmission occasion or the uplink transmission occasion based on a start occasion boundary or an end occasion boundary of the other transmission occasion of the downlink transmission occasion or the uplink transmission occasion such that a first portion of a first repetition of the one transmission occasion of the downlink transmission occasion or the uplink transmission occasion occurs prior to the first repetition boundary, a second repetition of the one transmission occasion of the downlink transmission occasion or the uplink transmission occasion occurs between the first repetition boundary and the third repetition boundary, and a second portion of the first repetition of the one transmission occasion of the downlink transmission occasion or the uplink transmission occasion occurs after the third repetition boundary.

8. The method of claim 7, wherein the one transmission occasion of the downlink transmission occasion or the uplink transmission occasion having the shifted first repetition boundary and the third repetition boundary includes a first number of resources associated with the first repetition of the one transmission occasion of the downlink transmission occasion or the uplink transmission occasion and a second number of resources associated with the second repetition of the one transmission occasion of the downlink transmission occasion or the uplink transmission occasion.

9. A user equipment (UE) comprising:
at least one processor; and
a memory coupled with the at least one processor and storing processor-readable code that, when executed by the at least one processor, is configured to:

receive scheduling information indicating one or more downlink transmission occasions and one or more uplink transmission occasions, each of the one or more downlink transmission occasions including a first repetition and a second repetition of a downlink transmission and each of the one or more uplink transmission occasions including a first repetition and a second repetition of an uplink transmission;

shift, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion; and perform, based on the shifted first repetition boundary, full duplex (FD) communication with repetition including:
receive, during the downlink transmission occasion, the first repetition of the respective downlink transmission via a first beam and the second repetition of the respective downlink transmission via a second beam; and
initiate transmission of, during the uplink transmission occasion, the first repetition of the respective uplink transmission via a third beam and the second repetition of the respective uplink transmission via a fourth beam.

10. The UE of claim 9, wherein:
the one or more downlink transmission occasions include one or more semi-persistent scheduling (SPS) transmissions,
the one or more uplink transmission occasions include one or more configured grant (CG) transmissions,
a first matched beam pair includes the first beam and the third beam, and
a second matched beam pair include the second beam and the fourth beam.

11. The UE of claim 9, wherein shifting the first repetition boundary of the one transmission occasion further includes shifting a start occasion boundary of the one transmission occasion or an end occasion boundary of the one transmission occasion.

12. The UE of claim 9, further comprising determining whether one or more symbols are available to shift a start occasion boundary or an end occasion boundary of the one transmission occasion of the downlink transmission occasion or the uplink transmission occasion by a first number of symbols.

13. The UE of claim 12, further comprising, based on a determination that the one or more symbols are unavailable, determining whether or not to refrain from receiving the downlink transmission during the downlink transmission occasion or transmitting the uplink transmission during the uplink transmission occasion.

14. The UE of claim 9, wherein shifting the first repetition boundary changes a number of symbols of consecutive symbols included in the first repetition of the one transmission occasion.

15. The UE of claim 14, further comprising adding a third repetition boundary to the one transmission occasion of the downlink transmission occasion or the uplink transmission occasion based on a start occasion boundary or an end occasion boundary of the other transmission occasion of the downlink transmission occasion or the uplink transmission occasion such that a first portion of a first repetition of the one transmission occasion of the downlink transmission occasion or the uplink transmission occasion occurs prior to the first repetition boundary, a second repetition of the one transmission occasion of the downlink transmission occasion or the uplink transmission occasion occurs between the first repetition boundary and the third repetition boundary, and a second portion of the first repetition of the one transmission occasion of the downlink transmission occasion or the uplink transmission occasion occurs after the third repetition boundary.

16. The UE of claim 15, wherein the one transmission occasion of the downlink transmission occasion or the uplink transmission occasion having the shifted first repetition boundary and the third repetition boundary includes a first number of resources associated with the first repetition of the one transmission occasion of the downlink transmission occasion or the uplink transmission occasion and a second number of resources associated with the second repetition of the one transmission occasion of the downlink transmission occasion or the uplink transmission occasion.

17. An apparatus configured for wireless communication, the apparatus comprising:
means for receiving scheduling information indicating one or more downlink transmission occasions and one or more uplink transmission occasions, each of the one or more downlink transmission occasions including a first repetition and a second repetition of a downlink transmission and each of the one or more uplink transmission occasions including a first repetition and a second repetition of an uplink transmission;
means for shifting, based on a partial time overlap between a downlink transmission occasion of the one or more downlink transmission occasions and an uplink transmission occasion of the one or more uplink transmission occasions, a first repetition boundary between the first repetition and the second repetition of one transmission occasion of the downlink transmission occasion or the uplink transmission occasion by a first number of symbols based on a second repetition boundary between the first repetition and the second repetition of the other transmission occasion of the downlink transmission occasion or the uplink transmission occasion; and
means for performing, based on the shifted first repetition boundary, full duplex (FD) communication with repetition including:
means for receiving, during the downlink transmission occasion, the first repetition of the respective downlink transmission via a first beam and the second repetition of the respective downlink transmission via a second beam; and
means for transmitting, during the uplink transmission occasion, the first repetition of the respective uplink transmission via a third beam and the second repetition of the respective uplink transmission via a fourth beam.

18. The apparatus of claim 17, wherein:
the one or more downlink transmission occasions include one or more semi-persistent scheduling (SPS) transmissions,
the one or more uplink transmission occasions include one or more configured grant (CG) transmissions, a first matched beam pair includes the first beam and the third beam, and a second matched beam pair include the second beam and the fourth beam.

19. The apparatus of claim 17, wherein the means for shifting the first repetition boundary of the one transmission occasion further includes means for shifting a start occasion boundary of the one transmission occasion or an end occasion boundary of the one transmission occasion.

20. The apparatus of claim 17, further comprising means for determining whether one or more symbols are available to shift a start occasion boundary or an end occasion boundary of the one transmission occasion of the downlink transmission occasion or the uplink transmission occasion by a first number of symbols.

21. The apparatus of claim 20, further comprising means for determining, based on a determination that the one or more symbols are unavailable, whether or not to refrain from receiving the downlink transmission during the downlink transmission occasion or transmitting the uplink transmission during the uplink transmission occasion.

22. The apparatus of claim 17, wherein shifting the first repetition boundary changes a number of symbols of consecutive symbols included in the first repetition of the one transmission occasion.

23. The apparatus of claim 22, further comprising means for adding a third repetition boundary to the one transmission occasion of the downlink transmission occasion or the uplink transmission occasion based on a start occasion boundary or an end occasion boundary of the other transmission occasion of the downlink transmission occasion or the uplink transmission occasion.

24. The apparatus of claim 23, wherein the one transmission occasion of the downlink transmission occasion or the uplink transmission occasion having the shifted first repetition boundary and the third repetition boundary includes a first number of resources associated with the first repetition of the one transmission occasion of the downlink transmission occasion or the uplink transmission occasion and a second number of resources associated with the second repetition of the one transmission occasion of the downlink transmission occasion or the uplink transmission occasion.

* * * * *